US009531830B2

(12) United States Patent
Lacasse et al.

(10) Patent No.: US 9,531,830 B2
(45) Date of Patent: Dec. 27, 2016

(54) ODATA OFFLINE CACHE FOR MOBILE DEVICE

(71) Applicant: SAP SE, Walldorf (DE)

(72) Inventors: Martin Lacasse, Montreal-Ouest (CA); Nipun Dev, Bangalore (IN); Sanjeet Mall, Heidelberg (DE)

(73) Assignee: SAP SE, Walldorf (DE)

(*) Notice: Subject to any disclaimer, the term of this patent is extended or adjusted under 35 U.S.C. 154(b) by 172 days.

(21) Appl. No.: 14/336,498

(22) Filed: Jul. 21, 2014

(65) Prior Publication Data
US 2016/0021209 A1 Jan. 21, 2016

(51) Int. Cl.
| | | |
|---|---|---|
| G06F 15/16 | (2006.01) |
| G06F 15/167 | (2006.01) |
| G06F 15/173 | (2006.01) |
| H04L 29/08 | (2006.01) |
| G06F 17/30 | (2006.01) |

(52) U.S. Cl.
CPC ..... *H04L 67/2842* (2013.01); *G06F 17/30371* (2013.01); *H04L 67/1097* (2013.01)

(58) Field of Classification Search
CPC ........ H04L 67/02; H04L 67/025; H04L 67/42; H04L 67/2842; H04L 67/1002; H04L 67/2876; H04L 69/08; H04L 69/329
USPC ....... 709/201, 213, 215, 217, 219, 225, 227, 709/236, 246
See application file for complete search history.

(56) References Cited

U.S. PATENT DOCUMENTS

| | | | |
|---|---|---|---|
| 7,275,105 B2 | 9/2007 | Bloch et al. | |
| 7,467,389 B2 | 12/2008 | Mukkamala et al. | |
| 7,703,015 B2 | 4/2010 | McKellar et al. | |
| 7,818,365 B2 | 10/2010 | Velline et al. | |
| 8,037,110 B2 | 10/2011 | Salgado et al. | |
| 8,296,375 B1* | 10/2012 | Katzer ................. | H04L 67/325 709/203 |
| 8,644,755 B2 | 2/2014 | Krebs et al. | |
| 8,645,973 B2 | 2/2014 | Bosworth et al. | |
| 8,701,105 B2 | 4/2014 | Knobel | |
| 2002/0004813 A1* | 1/2002 | Agrawal .......... | G06F 17/30902 709/201 |
| 2003/0158947 A1* | 8/2003 | Bloch ............... | G06F 17/30902 709/227 |
| 2004/0015504 A1* | 1/2004 | Ahad .................. | G06F 17/3048 |
| 2008/0098093 A1* | 4/2008 | Simon .................. | H04L 67/325 709/219 |
| 2008/0140941 A1 | 6/2008 | Dasgupta et al. | |
| 2009/0210631 A1 | 8/2009 | Bosworth et al. | |
| 2009/0228545 A1 | 9/2009 | Mendez et al. | |
| 2012/0150796 A1 | 6/2012 | Martick | |
| 2012/0278558 A1 | 11/2012 | Duftler et al. | |
| 2013/0318055 A1 | 11/2013 | Lorenz et al. | |
| 2013/0318192 A1 | 11/2013 | Lorenz et al. | |

* cited by examiner

*Primary Examiner* — Farzana Huq
(74) *Attorney, Agent, or Firm* — Jones Day (57) ABSTRACT

A server system may include a request handler and a storage. The request handler may receive at least one request from a program on a user side. The storage may include a first cache and a second cache, storing data in format directly compatible to the program. The first cache stores only data matching to a server. If the at least one request corresponds to a change to the data from the program, then the second cache stores the at least one request and the request handler sends the at least one request to the server for updating the change.

23 Claims, 5 Drawing Sheets

ODATA OFFLINE CACHE FOR MOBILE DEVICE

FIELD

The present invention relates generally to transferring data between data sources. More particularly, the present invention relates to systems and methods for providing consistent data interactivity for mobile devices during online mode and offline mode.

BACKGROUND

As data protocols advance and develop, interoperability needs to be supported for all major software vendors and manufacturers. As business or consumer applications are developed for increasingly mobile use, many applications follow the online application operation pattern where applications work only in an online or connected environment with backend data services (such as the SAP™ Netweaver™ Gateway). This means that once the end user enters a 'no connectivity' zone, there may be a delay in information exchange/sync with the network, and the operation of the application may be difficult to continue.

Also during this offline time, if the user's application is closed or killed, the updates/changes to the user's data may be lost, as he was not able to successfully post the updates/changes to the backend data service. Even in a pure online case, the business data reads through the network may encounter some lag time, and updates/changes to the data may also have to wait for the backend acknowledgements.

Thus, there remains a need for a simple way to handle data operations for both offline and online modes.

DETAILED DESCRIPTION

Considering data consumption models, data solutions may need to follow the online request response pattern in an offline mode, such that the response pattern is transparent/indifferent to the application developer as seamless online offline behavior. That is, the developer may expect to write a single piece of code, without additional coding to handle for both online and offline modes.

Figure 1:
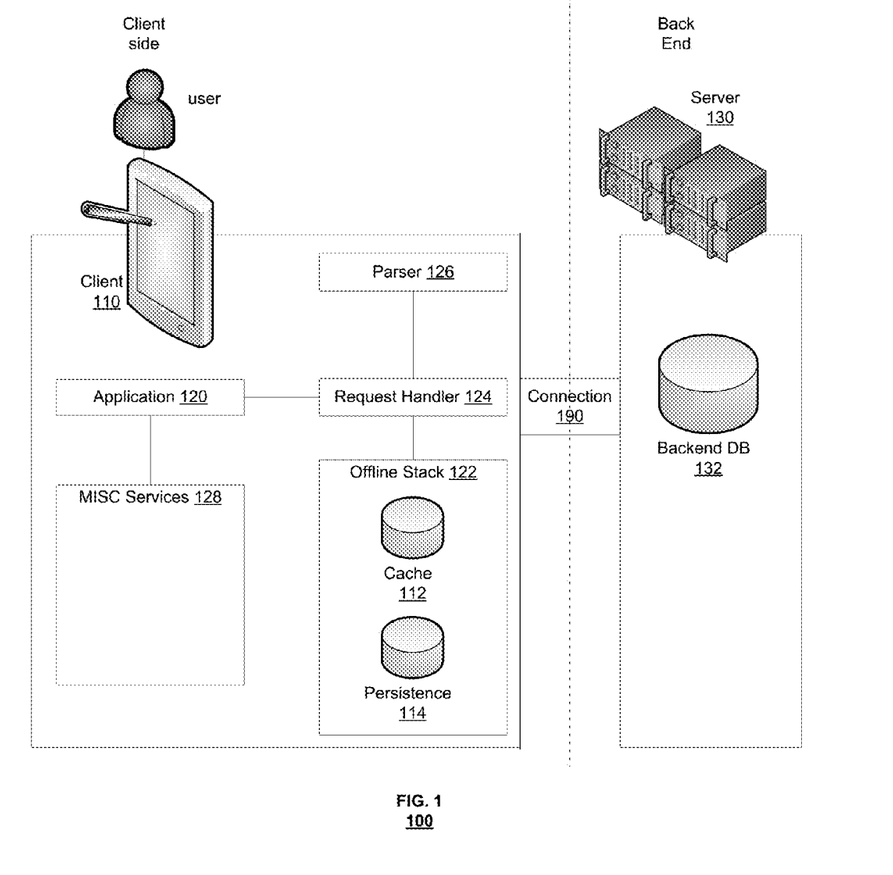
FIG. 1 illustrates an exemplary mobile device in a communication network according to an embodiment.

FIG. 1 illustrates an exemplary mobile device in a communication network according to an embodiment.

According to an embodiment, the mobile client device 110 may include a request handler 124 and a storage (offline stack 122). The request handler 124 may receive at least one request from a program (application 120) on a user side. The storage (offline stack 122) may include a first cache (persistence 114) and a second cache (cache 112), storing data in format directly compatible to the program (application 120). The first cache (persistence 114) stores only data matching to a server 130 on the backend. If the at least one request corresponds to a change to the data from the program (application 120), then the second cache (cache 112) stores the at least one request and the request handler 124 sends the at least one request to the server 130 for updating the change via connection 190.

The client device 110 may further include miscellaneous service programs 128 and a parser 126. The server 130 may further include a backend database (DB) 132.

The first cache 114 receives updates to the data from the server. The second cache 112 stores and queues the at least one request when the mobile device 110 is offline, and the request handler 124 sends the at least one request to the server 130 when the mobile device 110 is online. The first cache 114 receives incremental updates to the data from the server 130 when the mobile device 110 is online. The second cache 112 receives delta incremental updates from the server 110, and updates the data in the first cache 114. The format of the data may be an internet data format. The at least one request is an internet request with a hyperlink and is the same regardless of whether the mobile device 110 is online or offline.

The mobile device 110 may monitor the condition of the connection 190, to determine when to perform read (download) updates of data on the mobile device 110, and/or when to send update requests (upload) to the server 130. Generally for example, both of these may be performed in the background whenever the connection 190 indicates the mobile device 110 is connected/online with the server 130. However, the mobile device 110 may determine to delay communication in favor of other higher priority communications.

The mobile client device 110 may be online or offline (not connected for unpredictable time periods). That is, the mobile client device 110 may be connected to the server system 130 intermittently. As such, the mobile client device 110 may need to optimize communication of data, to ensure communication data integrity and reduce data corruption even in case of intermittent communication disconnections.

According to an embodiment, the server 130 communicates with the mobile client 110 device via a (wired, wireless, etc.) link.

The data stored in the offline stack 122 of the mobile device 110 may be based on a model (e.g., object or hierarchical model) that is in a format directly usable by application 120 without additional processing/conversion. A parser 126 may parse, and/or filter data available in the offline stack 122.

The network may be an internal network, an external network or a plurality of different interconnected networks which may include the Internet.

The client device 110 may include, for example, a mobile device (e.g., mobile phone or a smart phone), a personal computer, a tablet, a terminal device, or a personal digital assistant (PDA). The client device 110 may include an input device (e.g., a touch screen, a touch pad, a mouse or a keyboard) to receive commands from the user. In one embodiment, the client device 110 may be a terminal that displays information provided by the server 130. The server 130 may cause the client devices 110 to execute applications and display information on the client devices 110 in response to commands issued at the client device 110.

The data provider in the server 130 may be a data warehouse. The data warehouse may perform data cleaning, integration, transformation and refreshing. The data in the data warehouse may expose data via the Open Data Protocol (OData). In general, OData is a Web protocol for requesting and updating data stored at the data provider in the server 130. OData is operated by applying and building upon Web technologies such as Hypertext Transfer Protocol (HTTP), Atom Publishing Protocol (AtomPub), and JavaScript® Object Notation (JSON) to provide access to information from a variety of applications, services, and stores. OData may be used to expose and access information from a variety of sources including, but not limited to, relational databases, file systems, content management systems and traditional Web sites.

An efficient internet style storage pattern, referred to herein as OData Offline Cache, may follow a storage pattern where the business data is not stored into the traditional DB relational structure. Instead the data is stored as structured binary large objects (BLOBs) for each OData Request uniform resource locator (URL). These BLOBs contain structured or parsed Data in the form of OData parsed objects which can be directly consumed by application programs, even in an offline scenario. Storage of data in this format also saves parse times, unlike a pure online scenario where the data is first received in raw feeds of JavaScript Object Notation (json) or xml format and then parsed for application programs. Such a cache may not follow a traditional relational paradigm but rather may follow an Internet style or paradigm yielding, among other things, quick access, incrementally simpler operation, etc. Under this approach, the processing operations for offline data is removed or reduced, yielding among other things quick access operations involving data in its native format, structure, etc.

Unlike the traditional DB model where updates/inserts/deletes are directly replicated to local DB, the updates to data are actually managed in a separate queue with a different cache (second cache 112), and the update requests are fired/sent to the backend server 130 whenever there is network connectivity.

A first cache 114 may maintain each server record, as to replicate the behavior of the server 130, such that a user is working directly with a copy of the server data as if the client device 110 is 'online'. The server records are maintained in a different cache (first cache 114) from the local cache (second cache 112) for the updates/inserts/deletes. The first cache 114 is thus maintained in the same sync state as the backend data. The first cache 114 may be incrementally refreshed after a successful backend update operations with the latest state, preferably with support of delta handling. Invalidation of old data may not be necessary, but may be supported as required.

Incremental refresh/read from the server 110 may occur as requested by the application 120, if the application 120 requests for data content not previously stored in the first cache 114. Or, if data changed in the backend server 130 that correspond to the data in the first cache 114. Such data changes may occur as result of an update request from application 120, or from other devices connected to the server 130.

This allows for dynamic construction, population, management, etc. of the storage (offline stack 122) in support of the client device 110 for both online and offline mode.

Under this approach, server state, condition, etc. never touched by client updates. Server state data is always maintained and only refreshed by requesting the backend server 130 for changes. The client local updates may be managed differently using a separate cache (second cache 112) reliably. The first cache 114 may be updated through for example refresh operation (read requested by client) from server 130. Server state, condition, etc. is thus always authoritative.

Figure 2:
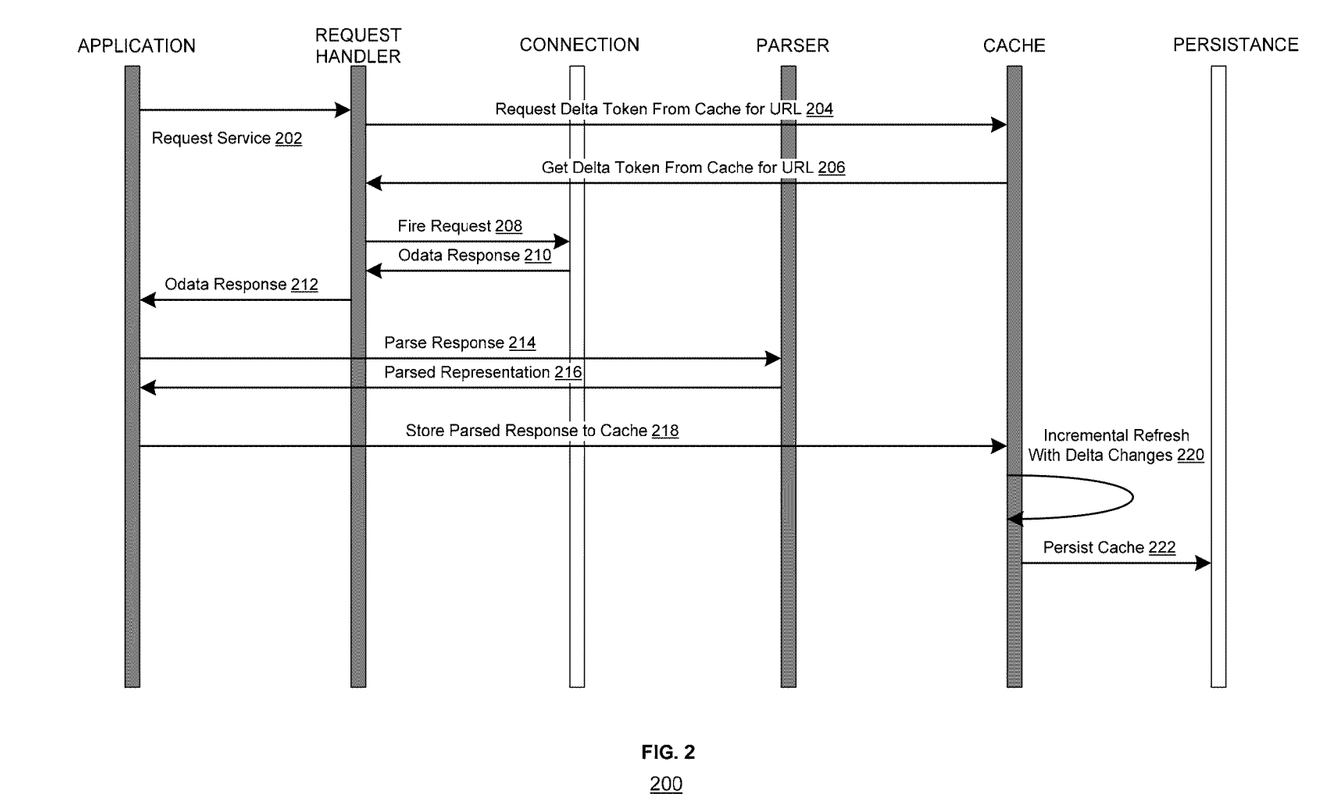
FIG. 2 illustrates an exemplary process according to an embodiment.

FIG. 2 illustrates an exemplary process 200 for incremental read of data from the backend server 130 to the client device 110, according to an embodiment.

According to an embodiment, the process 200 may begin with the application 120 requesting service at 202 to the request handler 124.

At 204, the request handler 124 may request delta token from cache 112 for URL.

At 206, the request handler 124 may receive delta token from cache 112 for URL.

At 208, the request handler 124 may fire/send request URL to backend server 130 via connection 190.

At 210, the request handler 124 may receive requested data (for example in internet data format) response from backend server 130 via connection 190.

At 212, the request handler 124 may send the requested data to the application 120.

At 214, the application 120 may send the requested data (in internet data format) to the parser 126 to parse/filter/convert.

At 216, the application 120 may receive parsed/filtered/converted data from the parser 126.

At 218, the application 120 may send the parsed/filtered/converted data to cache 112 for storage.

At 220, the cache 112 may refresh/update data corresponding to the delta changes locally.

At 222, as the delta changes match the data in the backend server 130, the cache 112 updates data in persistence cache 114 with the delta changes.

Figure 3:
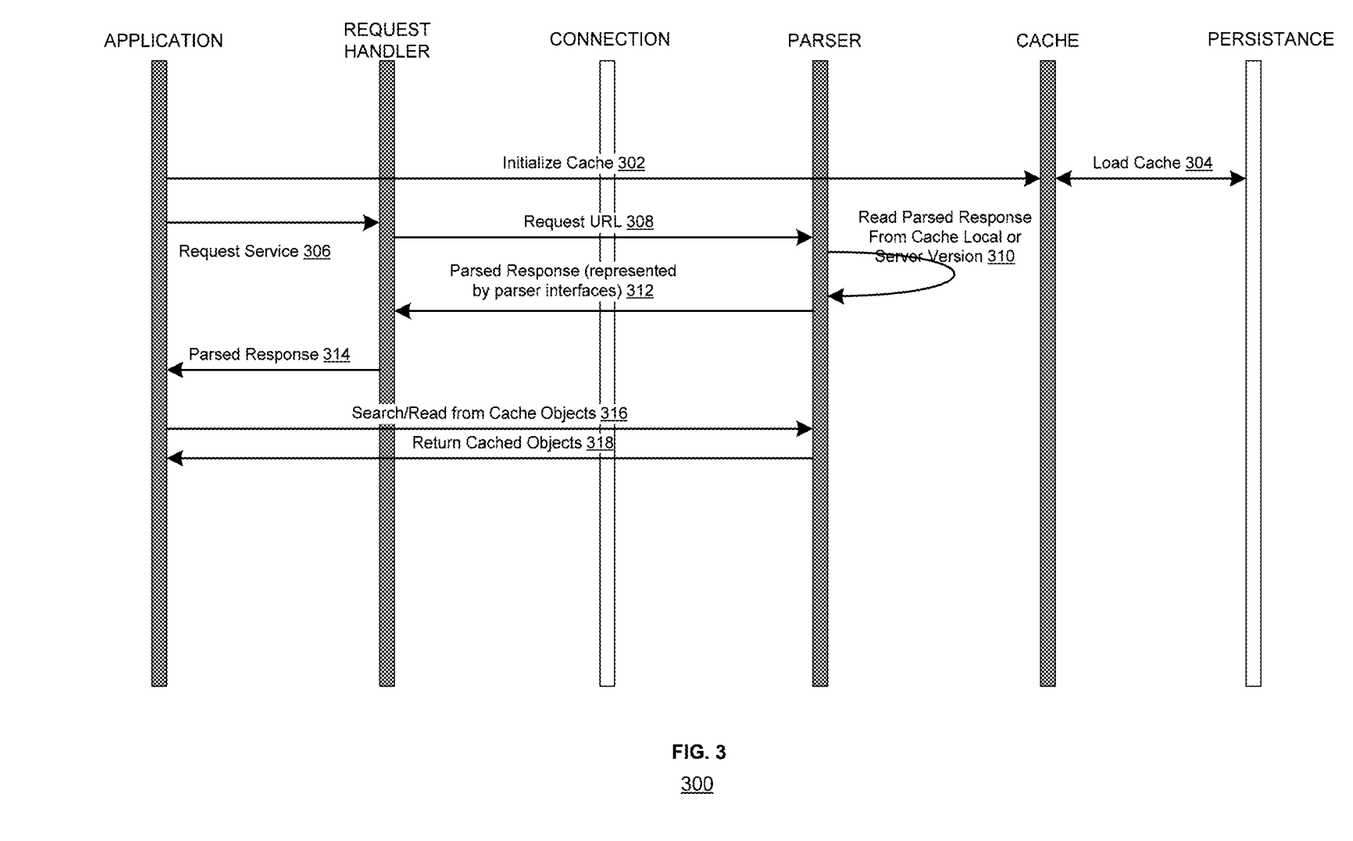
FIG. 3 illustrates an exemplary process according to an embodiment.

FIG. 3 illustrates an exemplary process 300 for read of data from the cache in the client device 110 in an offline scenario, according to an embodiment.

According to an embodiment, the process 300 may begin with the application 120 initializing the cache 112 at 302.

At 304, the cache 112 may load data from persistence cache 114. This may occur as often as needed, and/or in the background, as required by the application 120.

At 306, the application 120 may request service from the request handler 124.

At 308, the request handler 124 may send a data request URL to the parser 126.

At 310, the parser 126 may read parsed response from the local version in the cache 112 and/or from the server version in persistence cache 114. The local version may include locally changed data that are not yet updated to the backend server 130 or to the persistence cache 114. The different versions of the data may be differentiated by the parser 126.

At 312, the request handler 124 may receive the parsed response from the parser 126.

At 314, the request handler 124 may send the parsed response to the application 120.

At 316, the application 120 may request to search and/or read cached objects from the parser 126.

At 318, the application 120 may receive the searched and/or read cached objects from the parser 126.

Figure 4:
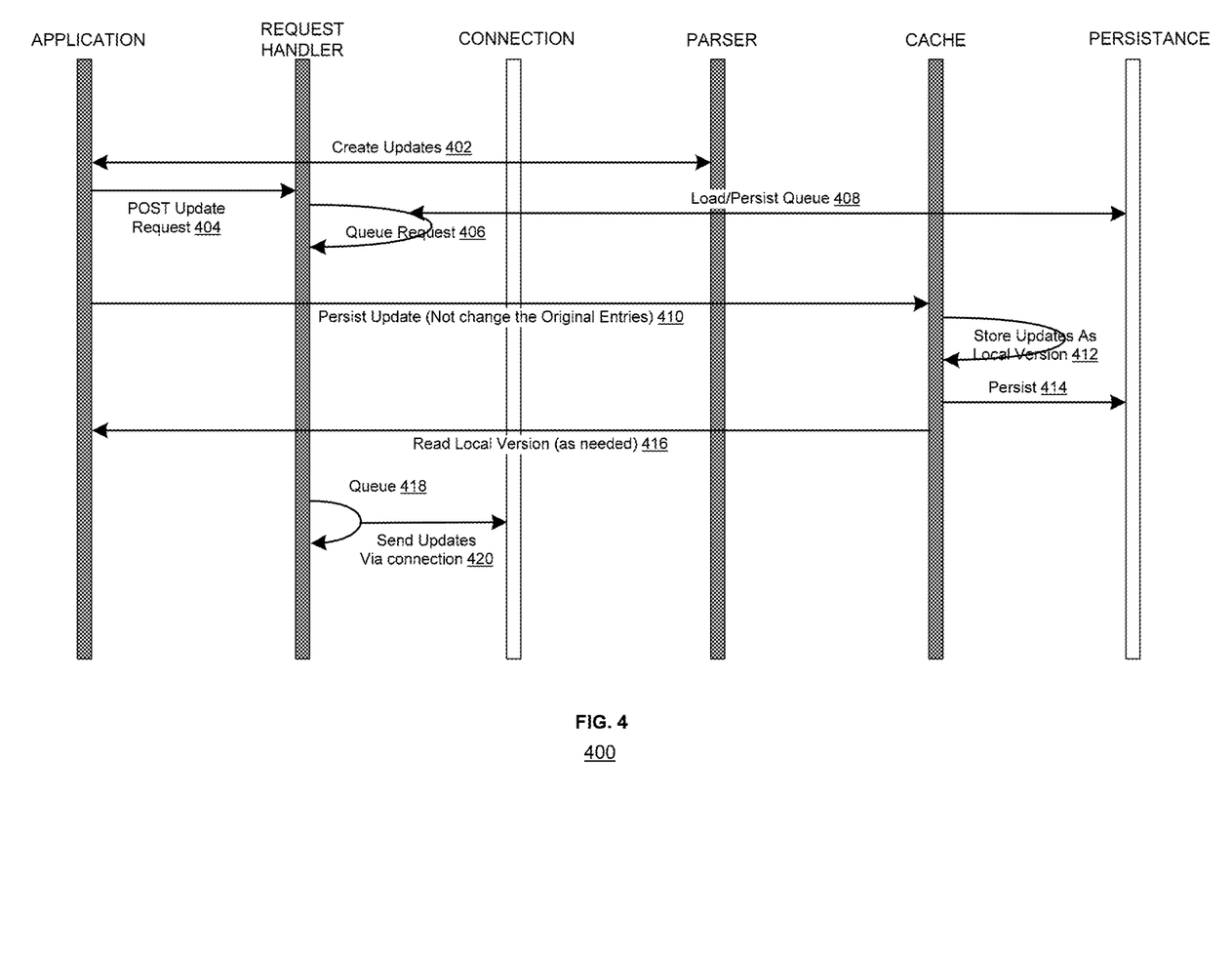
FIG. 4 illustrates an exemplary process according to an embodiment.

FIG. 4 illustrates an exemplary process 400 for making updates of data from the client device 110 to the backend server 130, according to an embodiment.

According to an embodiment, the process 400 may begin with the application 120 requesting to create updates at 402 to the parser 126.

At 404, the application 120 may post update request to the request handler 124.

At 406, the request handler 124 may queue the request.

At 408, the request handler 124 may load/persist the queued requests to/from the persistence cache 114, such that statuses of queued requests are maintained.

At 410, the application 120 may persist updates of the data to the cache 112 without affecting the original/server version of the data.

At 412, the cache 112 may store the updates of the data as local version.

At 414, the cache 112 may persist the updates of the data to the persistence cache 114 without affecting the original/server version of the data.

At 416, the application 120 may receive the local version of the data as needed from cache 112.

At 418, the request handler 124 may continuously queue the update request.

At 420, the request handler 124 may send the updates of the data to the server 130 via connection 190.

Subsequent to the updates of the data to the server 130, the client device 110 may perform an incremental update/read of the data from the server 130, as illustrated in FIG. 2.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

Figure 5:
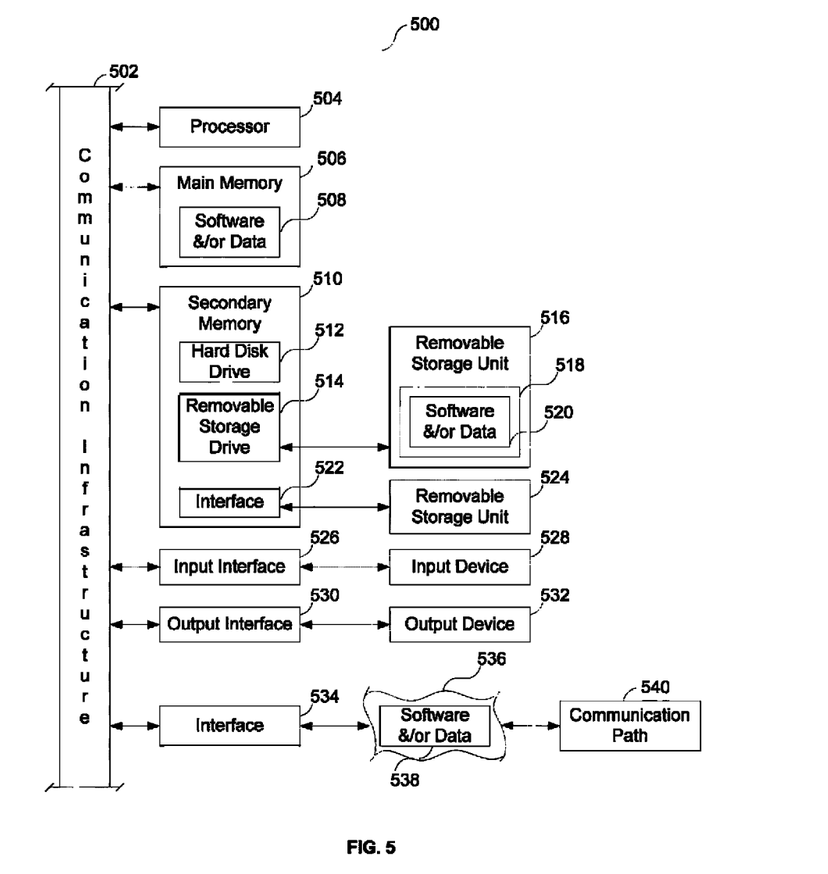
FIG. 5 illustrates an exemplary system according to an embodiment.

Aspects of the above may be implemented by software, firmware, hardware, or any combination thereof. FIG. 5 illustrates an example computer system 500 in which the above, or portions thereof, may be implemented as computer-readable code. Various embodiments of the above are described in terms of this example computer system 500. The client device 110 and the server 130 may each be a computer system 500.

Computer system 500 includes one or more processors, such as processor 504. Processor 504 can be a special purpose processor or a general purpose processor. Processor 504 is connected to a communication infrastructure 502 (for example, a bus or a network).

Computer system 500 also includes a main memory 506, preferably Random Access Memory (RAM), containing possibly inter alia computer software and/or data 508.

Computer system 500 may also include a secondary memory 510. Secondary memory 510 may include, for example, a hard disk drive 512, a removable storage drive 514, a memory stick, etc. A removable storage drive 514 may comprise a floppy disk drive, a magnetic tape drive, an optical disk drive, a flash memory, or the like. A removable storage drive 514 reads from and/or writes to a removable storage unit 516 in a well-known manner. A removable storage unit 516 may comprise a floppy disk, magnetic tape, optical disk, etc. which is read by and written to by removable storage drive 514. As will be appreciated by persons skilled in the relevant art(s) removable storage unit 516 includes a computer usable storage medium 518 having stored therein possibly inter alia computer software and/or data 520.

In alternative implementations, secondary memory 510 may include other similar means for allowing computer programs or other instructions to be loaded into computer system 500. Such means may include, for example, a removable storage unit 524 and an interface 522. Examples of such means may include a program cartridge and cartridge interface (such as that found in video game devices), a removable memory chip (such as an Erasable Programmable Read-Only Memory (EPROM), or Programmable Read-Only Memory (PROM)) and associated socket, and other removable storage units 524 and interfaces 522 which allow software and data to be transferred from the removable storage unit 524 to computer system 500.

Computer system 500 may also include an input interface 526 and a range of input devices 528 such as, possibly inter alia, a keyboard, a mouse, etc.

Computer system 500 may also include an output interface 530 and a range of output devices 532 such as, possibly inter alia, a display, one or more speakers, etc.

Computer system 500 may also include a communications interface 534. Communications interface 534 allows software and/or data 538 to be transferred between computer system 500 and external devices. Communications interface 534 may include a modem, a network interface (such as an Ethernet card), a communications port, a Personal Computer Memory Card International Association (PCMCIA) slot and card, or the like. Software and/or data 538 transferred via communications interface 534 are in the form of signals 536 which may be electronic, electromagnetic, optical, or other signals capable of being received by communications interface 534. These signals 536 are provided to communications interface 534 via a communications path 540. Communications path 540 carries signals and may be implemented using wire or cable, fiber optics, a phone line, a cellular phone link, a Radio Frequency (RF) link or other communications channels.

As used in this document, the terms "computer program medium," "computer usable medium," and "computer readable medium" generally refer to media such as removable storage unit 516, removable storage unit 524, and a hard disk installed in hard disk drive 512. Signals carried over communications path 540 can also embody the logic described herein. Computer program medium and computer usable medium can also refer to memories, such as main memory 506 and secondary memory 510, which can be memory semiconductors (e.g. Dynamic Random Access Memory (DRAM) elements, etc.). These computer program products are means for providing software to computer system 500.

Computer programs (also called computer control logic) are stored in main memory 506 and/or secondary memory 510. Computer programs may also be received via communications interface 534. Such computer programs, when executed, enable computer system 500 to implement the present invention as discussed herein. In particular, the computer programs, when executed, enable processor 504 to implement the processes of aspects of the above. Accordingly, such computer programs represent controllers of the computer system 500. Where the invention is implemented using software, the software may be stored in a computer program product and loaded into computer system 500 using removable storage drive 514, interface 522, hard drive 512 or communications interface 534.

The invention is also directed to computer program products comprising software stored on any computer useable medium. Such software, when executed in one or more data processing devices, causes data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, Compact Disc Read-Only Memory (CD-ROM) disks, Zip disks, tapes, magnetic storage devices, optical storage devices, Microelectromechanical Systems (MEMS), nanotechnological storage device, etc.), and communication mediums (e.g., wired and wireless communications networks, local area networks, wide area networks, intranets, etc.).

It is important to note that the particulars of FIG. 5 (such as for example the specific components that are presented, the component arrangement that is depicted, etc.) are illustrative only and it will be readily apparent to one of ordinary skill in the relevant art that numerous alternatives (including inter alia other or different components, alternative arrangements, etc.) are easily possible.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the disclosure may be implemented using Java, C++, or other object-oriented programming language and development tools. Another embodiment of the disclosure may be implemented in hardwired circuitry in place of, or in combination with machine readable software instructions.

A data provider may be an information resource. Data provider may include sources of data that enable data storage and retrieval. Data provider may include databases, such as, relational, transactional, hierarchical, multi-dimensional (e.g., Online Analytic Processing—OLAP), object oriented databases, and the like. Further data provider may include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., Enterprise resource planning system), and the like. These data providers can include associated data foundations, semantic layers, management systems, security systems and so on.

A semantic layer is an abstraction overlying one or more data sources. It removes the need for a user to master the various subtleties of existing query languages when writing queries. The provided abstraction includes metadata description of the data sources. The metadata can include terms meaningful for a user in place of the logical or physical descriptions used by the data source. For example, common business terms in place of table and column names. These terms can be localized and or domain specific. The semantic layer may include logic associated with the underlying data allowing it to automatically formulate queries for execution against the underlying data sources. The logic includes connection to, structure for, and aspects of the data sources. Some semantic layers can be published, so that it can be shared by many clients and users. Some semantic layers implement security at a granularity corresponding to the underlying data sources' structure or at the semantic layer. The specific forms of semantic layers includes data model objects that describe the underlying data source and define dimensions, attributes and measures with the underlying data. The objects can represent relationships between dimension members, and can provide calculations associated with the underlying data.

It is appreciated that the disclosure is not limited to the described embodiments, and that any number of scenarios and embodiments in which conflicting appointments exist may be resolved.

Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather the disclosure extends to all functionally equivalent structures, methods, and uses such as are within the scope of the appended claims.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as code segments in computer-readable media, it is to be understood that dedicated hardware implementations, such as application specific integrated circuits, programmable logic arrays and other hardware devices, may be constructed to implement one or more of the embodiments described herein. Applications that may include the various embodiments set forth herein may broadly include a variety of electronic and computer systems. Accordingly, the present application may encompass software, firmware, and hardware implementations, or combinations thereof.

The present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "disclosure" merely for convenience and without intending to voluntarily limit the scope of this application to any particular disclosure or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

For simplicity of exposition, the term 'database' was employed in aspects of the above discussion. It will be readily apparent to one of ordinary skill in the art that in the context of the above discussion the scope of that term is not limited just to for example a database management system but rather encompasses inter alia any data source, data model, etc.

In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

We claim:

1. A mobile device for online and offline data communication comprising:
    a storage comprising a first cache and a second cache, storing data in format directly compatible to a program on a user side,
    wherein the first cache stores only data matching to a server, and
    the second cache, which stores at least one request if the at least one request corresponds to a change to the data from the program, receives delta incremental updates from the server and updates the data in the first cache; and
    a request handler receiving the at least one request from the program and sending the at least one request that is stored in the second cache to the server for updating the change to the data from the program,
    wherein an order of communication of a plurality of requests is determined based on a priority of the plurality of requests.

2. The mobile device of claim 1, wherein the first cache receives updates to the data from the server.

3. The mobile device of claim 1, wherein the second cache stores and queues the at least one request when the mobile device is offline, and the request handler sends the at least one request to the server when the mobile device is online.

4. The mobile device of claim 1, wherein the first cache receives incremental updates to the data from the server when the mobile device is online.

5. The mobile device of claim 1, wherein the format of the data is an internet data format.

6. The mobile device of claim 1, wherein the at least one request is an internet request with a hyperlink and is the same regardless of whether the mobile device is online or offline.

7. A method of a mobile device for online and offline data communication, comprising:
    storing, by a storage comprising a first cache and a second cache, data in format directly compatible to a program on a user side,
    wherein the first cache stores only data matching to a server, and the second cache, which stores at least one request if the at least one request corresponds to a change to the data from the program, receives delta incremental updates from the server and updates the data in the first cache;
    receiving, by a request handler, the at least one request from the program: and sending, by the request handler, the at least one request that is stored in the second cache to the server for updating the change to the data from the program, wherein an order of communication of a plurality of requests is determined based on a priority of the plurality of requests.

8. The method of claim 7, wherein the first cache receives updates to the data from the server.

9. The method of claim 7, wherein the second cache stores and queues the at least one request when the mobile device is offline, and the request handler sends the at least one request to the server when the mobile device is online.

10. The method of claim 7, wherein the first cache receives incremental updates to the data from the server when the mobile device is online.

11. The method of claim 7, wherein the format of the data is an internet data format.

12. The method of claim 7, wherein the at least one request is an internet request with a hyperlink and is the same regardless of whether the mobile device is online or offline.

13. A non-transitory computer readable medium storing program codes executable by a processor of a mobile device for online and offline data communication, to perform:
storing, by a storage comprising a first cache and a second cache, data in format directly compatible to a program on a user side,
wherein the first cache stores only data matching to a server, and the second cache, which stores at least one request if the at least one request corresponds to a change to the data from the program, receives delta incremental updates from the server and updates the data in the first cache;
receiving, by a request handler, the at least one request from the program; and
sending, by the request handler, the at least one request that is stored in the second cache to the server for updating the change to the data from the program, wherein an order of communication of a plurality of requests is determined based on a priority of the plurality of requests.

14. The non-transitory computer readable medium of claim 13, wherein the first cache receives updates to the data from the server.

15. The non-transitory computer readable medium of claim 13, wherein the second cache stores and queues the at least one request when the mobile device is offline, and the request handler sends the at least one request to the server when the mobile device is online.

16. The non-transitory computer readable medium of claim 13, wherein the first cache receives incremental updates to the data from the server when the mobile device is online.

17. The non-transitory computer readable medium of claim 13, wherein the format of the data is an internet data format.

18. The mobile device of claim 1, wherein a parser parses data that is available in the storage.

19. The mobile device of claim 2, wherein the first cache receives updates when the program requests for data that is not stored in the first cache.

20. The method of claim 7, wherein a parser parses data that is available in the storage.

21. The method of claim 8, wherein the first cache receives updates when the program requests for data that is not stored in the first cache.

22. The non-transitory computer readable medium of claim 13, wherein a parser parses data that is available in the storage.

23. The non-transitory computer readable medium of claim 14, wherein the first cache receives updates when the program requests for data that is not stored in the first cache.

* * * * *